US 12,049,377 B2

(12) United States Patent
Alves (10) Patent No.: US 12,049,377 B2
(45) Date of Patent: Jul. 30, 2024

(54) DEVICE FOR TREATING SEVERAL SURFACES OF OBJECTS, AND CORRESPONDING TREATMENT METHOD

(71) Applicant: Antonio Alves, Chécy (FR)

(72) Inventor: Antonio Alves, Chécy (FR)

( * ) Notice: Subject to any disclaimer, the term of this patent is extended or adjusted under 35 U.S.C. 154(b) by 132 days.

(21) Appl. No.: 17/779,178

(22) PCT Filed: Nov. 26, 2020

(86) PCT No.: PCT/IB2020/061168
§ 371 (c)(1),
(2) Date: May 24, 2022

(87) PCT Pub. No.: WO2021/105913
PCT Pub. Date: Jun. 3, 2021

(65) Prior Publication Data
US 2022/0402714 A1    Dec. 22, 2022

(30) Foreign Application Priority Data

Nov. 26, 2019    (FR) ...................................... 1913259

(51) Int. Cl.
*B65H 5/04*        (2006.01)
*B41J 3/407*       (2006.01)
(Continued)

(52) U.S. Cl.
CPC ............. *B65H 5/04* (2013.01); *B41J 3/4073* (2013.01); *B65H 15/016* (2020.08); *G06K 19/145* (2013.01); *B65H 2701/1914* (2013.01)

(58) Field of Classification Search
CPC . B41J 13/12; B41J 3/4073; B41J 11/06; B41J 3/40731; B41J 3/60; B41J 29/38;
(Continued)

(56) References Cited

U.S. PATENT DOCUMENTS

2011/0090277 A1    4/2011    Pomerantz et al.
2018/0326763 A1    11/2018   Wooldridge et al.

FOREIGN PATENT DOCUMENTS

CN        110126463 A    8/2019
FR        2827807 A1     1/2003
(Continued)

OTHER PUBLICATIONS

International Search Report; priority document.

*Primary Examiner* — Jannelle M Lebron
(74) *Attorney, Agent, or Firm* — Greer, Burns & Crain, Ltd.

(57) ABSTRACT

A device and method for treating several surfaces of objects, including treatment equipment for carrying out a treatment on a surface of an object; a shuttle having at least two locations configured to receive objects, which is mounted to as to be able to move between two positions, passing through intermediate positions in which the shuttle presents one surface of the objects to the treatment equipment; a first piece of handling equipment capable of placing an object in a first location when the shuttle is in its first position; a second piece of handling equipment configured to remove one object from the second location; and third piece of handling equipment configured to remove the object from the first location and turning it before placing the object in the second location.

12 Claims, 8 Drawing Sheets

(51) Int. Cl.
*B65H 15/00* (2006.01)
*G06K 19/14* (2006.01)

(58) Field of Classification Search
CPC .... B41J 3/407; B65H 2701/1914; B65H 5/04; B65H 15/016; B65H 15/00; G06K 13/07; G06K 19/145; B65G 47/248
See application file for complete search history.

(56) References Cited

FOREIGN PATENT DOCUMENTS

| | | |
|---|---|---|
| JP | 5096718 B2 | 12/2012 |
| WO | 2007104854 A2 | 9/2007 |
| WO | 2011101701 A1 | 8/2011 |

DEVICE FOR TREATING SEVERAL SURFACES OF OBJECTS, AND CORRESPONDING TREATMENT METHOD

CROSS-REFERENCES TO RELATED APPLICATIONS

This application claims the benefit of the International Application No. PCT/IB2020/061168, filed on Nov. 26, 2020, and of the French patent application No. 1913259 filed on Nov. 26, 2019, the entire disclosures of which are incorporated herein by way of reference.

FIELD OF THE INVENTION

The present invention relates to a processing device capable of performing processing on at least two substantially planar faces of objects.

The invention thus relates, in particular, to a processing device capable of processing both faces of cards.

It relates in particular, but not exclusively, to a device capable of printing at least two faces of objects, for example the two faces of cards.

This invention applies in particular, but not exclusively, to the processing applied to the cards meeting the conditions defined by the ISO 7810 and 7816 standards.

The invention also relates to a method for processing several faces of objects.

BACKGROUND OF THE INVENTION

Very many objects have several substantially planar faces. Among these objects, one can find a large number of flat objects, such as for example cards, which essentially have two faces opposite each other. Considered as opposite faces, in the present description, are the faces of an object that are substantially parallel and oriented in opposite directions.

One can also find, for example, parallelepipedic objects such as boxes, for example boxes of cigarettes, candy boxes or the like, which can have six faces, opposite in pairs. It is often useful to carry out processing on the surface of several of these faces, such as for example impressions. This processing can have the effect of customizing the object undergoing this processing.

Among these objects, cards, most often made of plastic material, are today used in multiple applications, for example as a means of payment, or as an official identification document. They can thus have magnetic tracks or electronic chips allowing them to be used as payment cards or bank cards, identification cards, loyalty cards, etc. Most of the cards used are manufactured in accordance with the conditions defined by the ISO 7810 and 7816 standards. These cards are usually rigid or semi-rigid, and are not meant to be folded. This feature imposes special handling conditions for the cards.

In many applications, it is necessary for the external appearance of the cards to be personalized, for example to show the name of the cardholder, a number, etc. This personalization can be obtained by at least one treatment such as the printing of these characteristics on the faces of the card, for example by a known ink jet printing process or by a laser engraving process. Other treatments, such as label gluing or varnishing, can be carried out on the faces of the card.

Increasingly, it is often required that both faces of each card be custom printed, or undergo the same processing. Such processing of both faces can be obtained by passing the card successively through two items of processing equipment, and by turning it between these two items of equipment. Such a method, however, requires the implementation of a bulky and expensive device.

There are also known processing devices which have a return path making it possible to return a card, after it has passed through a printer, upstream of this printer, so that its second face is printed. Such devices require the installation of return conveyors which increase the volume of the printing device.

In the same way, when an object which has several faces must undergo the same treatment on several of its faces, it is often necessary to pass this object, successively, in several processing equipment pieces, by turning it between each of these equipment pieces to present a different face for each piece of equipment. Such a method requires the implementation of a bulky and expensive device.

SUMMARY OF THE INVENTION

The present invention aims to overcome these drawbacks of the prior art.

In particular, an object of the present invention is, in particular, to propose a device capable of processing several faces of an object, and, for example, the two faces of a card, which has reduced bulk and cost.

Another object of the invention is to provide such a device which makes it possible to carry out the processing at a high rate.

Another object of the invention is to provide such a device which is simple and quick to maintain.

These objectives, as well as others which will appear more clearly subsequently, are achieved with the aid of a device for processing several faces of objects, comprising at least one item of processing equipment able to carry out a processing on one face of an object presented opposite the processing equipment(s), this device also comprising, according to the invention, a shuttle having at least two slots suitable for receiving objects, the shuttle being mounted so as to move between a first position and a second position, passing through intermediate positions in which it has a face of the objects placed in the slots opposite the processing equipment;

a first handling device, capable of placing an object in the first slot, when the shuttle is in the first position;

a second handling device capable of removing an object placed in the second slot; and a third handling device able to remove an object placed in the first slot and to turn it before placing it in the second slot.

Thus, several faces of the same object can be treated by the same processing equipment, even if the latter is designed to apply its treatment only to one face at a time. The shuttle, performing round trips between its first position and its second position, allows each round trip to process one face of at least two different objects. The succession of these round trips makes it possible to process, at a rapid rate, several faces of multiple objects.

It should be noted that, preferably, the processing equipment only performs processing on the faces of the objects when the latter pass opposite the processing equipment while moving from the first position to the second position of the shuttle. It is however possible, alternatively or additionally, for the processing equipment to perform processing on the faces of the objects when the latter pass opposite the processing equipment while moving from the second position towards the first position of the shuttle.

Advantageously, the third item of handling equipment is placed so as to handle the objects carried by the shuttle when the shuttle is in the second position.

Thus, the movement of the object from the first slot to the second slot takes place downstream of the processing equipment. It is also possible, in other embodiments, for this reversal to take place at other positions.

It is, for example, possible that, after passing in front of the processing equipment, the shuttle returns to its first position with the object contained in its first slot, and that the removal of this object, its reversal and its placement in the second slot are performed upstream of the equipment, for example near the first position, just before placing a new object in the first slot.

Advantageously, the second item of handling equipment is placed so as to handle the objects carried by the shuttle when the shuttle is in the second position.

Therefore, the object is removed from the second slot takes place downstream of the processing equipment. This removal can be followed by sending the object to another piece of equipment. It can also be immediately followed by the placement of the object in a third slot on the shuttle, for example in a position such that it can present a third face to the processing equipment. The shuttle can thus have a number of slots at least equal to the number of faces to be processed of an object, the same object successively occupying these slots so that its faces are processed.

It is also possible, in other embodiments, for this withdrawal to take place at other positions. It is, for example, possible that, after passing in front of the processing equipment, the shuttle returns to its first position with the object contained in its second slot, and that this object is removed upstream of the equipment, for example close to the first position, just before the object from the first slot is placed in the second slot.

Advantageously, the processing equipment comprises at least one printer able to print on one face of an object, which can be of the "drop on demand" type.

Advantageously, the slots are arranged, relative to the shuttle, so as to successively pass opposite the processing equipment(s), when the shuttle moves between the first position and the second position.

The processing equipment can thus be chosen to carry out its processing over a width not exceeding the maximum width of an object to be processed, which reduces the cost of such equipment.

It is however possible, in a variant, for the selected equipment to be able to perform its processing over a width corresponding to the width of several objects to be processed. In this case, several slots can be provided abreast on the shuttle. It may thus be possible for the shuttle to have several first slots placed abreast and several second slots placed abreast, or for the first slot and the second slot to be placed abreast.

In an advantageous embodiment, the slots are arranged, relative to the shuttle, so that the second slot passes opposite the processing equipment before the first slot when the shuttle moves from the first position towards the second position.

In this embodiment, it is thus possible, if the shuttle has only a first slot and a second slot, for the two processed faces of the same object to be treated successively, without one face of another object being processed between the two faces of the same object.

Advantageously, the first and second slots are each capable of receiving a flat object placed in a substantially horizontal position, leaving the upper face of the object visible.

In this case, the equipment makes it possible to process the two substantially opposite faces of this object, the upper face, facing upwards, being able to be processed by the item(s) of processing equipment.

Advantageously, the shuttle is movable in translation, between the first position and the second position, along at least one guide rail.

The shuttle thus performs round trips along this rail between its first position and its second position.

Of course, the shuttle can be driven, in its round trips between these positions, by suitable drive means, such as a motor or a jack.

According to an advantageous embodiment, the device comprises a manipulator comprising a clamp constituting the second handling equipment and a clamp constituting the third item of handling equipment.

According to an advantageous embodiment, the shuttle is a carriage in which the slots are defined, the carriage being able to carry the objects placed in these slots.

This embodiment allows easy movement of objects, which are carried by the shuttle and are then in contact with no other surface. However, it is also possible for objects to move along a path. The shuttle, in this case, does not necessarily carry the objects placed in the slots, but pushes them. The objects continue, in such an embodiment, to move with the shuttle.

Advantageously, in the object processing device according to the invention, the first item of handling equipment is configured to place an object in a first slot, when the shuttle is in the first position, the second item of handling equipment is configured to remove an object placed in the second slot, and the third item of handling equipment is configured to remove an object placed in the first slot and rotate it before placing it in the second slot.

At least some of the objectives can also be achieved with the aid of a device for processing the two opposite faces of cards, comprising at least one item of processing equipment able to carry out processing on a face of cards presented facing said processing equipment, this device also comprising, according to the invention, a shuttle having at least two slots suitable for receiving cards in a substantially horizontal position, the shuttle being mounted so as to move between a first position and a second position, passing through intermediate positions in which it presents a face of the cards placed in the slots in view of the item(s) of processing equipment;

a first handling device, capable of placing a card in a first of the slots, a first face facing upwards, when the shuttle is in the first position;

a second handling device capable of removing a card placed in the second slot; and a third handling device capable of removing a card placed in the first slot, a first face facing upwards, and placing it in the second slot, its second face facing upwards.

Thus, the equipment makes it possible to process successively, with the same processing equipment or equipment, the two faces of the cards. Such a solution is very advantageous compared to the solutions known from the prior art for processing the two faces of cards, which required the use of different processing equipment for each face. It is also advantageous compared to the known solution implementing a cumbersome return path, aiming to pass the same card twice under the same processing equipment. It also allows the processing of both faces of the cards to be carried out at a rapid rate.

Advantageously, in this device for processing the two opposite faces of cards, the first item of handling equipment is configured to place a card in a first of the slots, when the shuttle is in the first position, the second item of handling equipment is configured to remove a card placed in the second slot, and the third item of handling equipment is configured to remove a card placed in the first slot and rotate it before placing it in the second slot.

Advantageously, the third item of handling equipment is placed so as to handle the cards carried by the shuttle when the shuttle is in the second position.

Thus, the displacement and the reversal of the card from the first slot to the second slot is done downstream of the processing equipment. It is also possible, in other embodiments, for this reversal to take place at other positions.

Advantageously, the second item of handling equipment is placed so as to handle the cards carried by the shuttle when the shuttle is in the second position.

Thus, the card is removed from the second slot downstream of the processing equipment.

It is also possible, in other embodiments, for the second and/or third items of handling equipment to be placed at other positions. It is, for example, possible for the same handler to comprise the first, second and third items of handling equipment, which can carry out their operations when the shuttle is in its first position. In this case, this handler removes the card from the second slot, places in this second slot, in the upturned position, the card coming from the first slot, and places a new card in the first slot, these operations being able to be carried out simultaneously or almost simultaneously.

In this embodiment, the processing rate can be improved. Indeed, the shuttle no longer needs to park in its second position, downstream of the processing equipment. After its passage next to the processing equipment, it can immediately return to its first position.

Advantageously, the processing equipment comprises at least one printer able to print on one face of a card, this printer possibly being of the "drop on demand" type.

Such a printer allows the faces of each card to be personalized, even if these cards circulate facing the printer at high speed.

Advantageously, the slots are arranged, relative to the shuttle, so as to successively pass opposite the item(s) of processing equipment, when the shuttle moves between the first position and the second position.

Thus, the processing equipment, for example the printers, can be chosen to process only the width of a card.

Advantageously, the slots are arranged, relative to the shuttle, so that the second slot passes opposite the item(s) of processing equipment before the first slot when the shuttle moves from the first position to the second position.

Thus, if the processing equipment only performs processing when the shuttle moves from its first position to its second position, the two faces of the same card are processed successively, without one face of another card being processed between the first face and the second face of the same card.

Advantageously, the shuttle is movable in translation, between the first position and the second position, along at least one guide rail.

Of course, the shuttle can be driven, in its round trips between these positions, by suitable drive means, such as a motor or a jack.

According to an advantageous embodiment, the device comprises a manipulator comprising a clamp constituting the second handling equipment and a clamp constituting the third item of handling equipment.

Advantageously, the shuttle is a carriage in which the slots are defined, the carriage being able to carry the cards placed in these slots in a substantially horizontal position.

At least some of the objectives can also be achieved according to the invention using a method for processing several faces of objects, comprising:
  a step of placing a first object in a first slot provided in a shuttle, the shuttle having a second slot comprising a second object;
  a step of moving the shuttle along a trajectory during which one face of each of the first and second objects passes opposite processing equipment able to perform a treatment on that face;
  a step of unloading the second object from the second slot;
  a step of unloading the first object from the first slot, turning over the first object, and placing the first object, in an inverted position, in the second slot.

These steps can be repeated several times, to allow the treatment of several faces of several objects. They can be implemented successively. However, in an advantageous embodiment, the two unloading steps can also be implemented simultaneously, or almost simultaneously. It is also possible, in another advantageous embodiment, for the two unloading steps to be implemented simultaneously, or almost simultaneously, with the implementation of a new step of placing a new object in the first shuttle slot.

Such a method may exhibit, alone or in combination, the additional characteristics which are described in the present description, in connection with one or other of the embodiments.

At least some of the objectives can also be achieved according to the invention using a method for processing the two opposite faces of a card, comprising:
  a step of placing a first card in a first slot provided in a shuttle, the shuttle having a second slot comprising a second card;
  a step of moving the shuttle along a trajectory during which one face of each of the first and second cards passes opposite processing equipment able to perform processing on that face;
  a step of unloading the second card from the second slot,
  a step of unloading the first card from the first slot, of turning over and placing the first card, in a turned over position, in the second slot.

These steps can be repeated several times, to allow the treatment of several faces of several objects. Such a method may exhibit, alone or in combination, the additional characteristics which are described in the present description, in connection with one or other of the embodiments.

At least some of the objectives can also be achieved according to the invention using a process for processing, by processing equipment, the faces of objects, successively comprising:
  a step of processing at least a first face of a second object and a second face of a first object whose first face has been treated previously, during the passage in a first direction of the first face of the second object and second face of the first object opposite the processing equipment, the first object and second object being driven by a shuttle, a step of passing in a second direction, opposite to the first direction, the second object opposite the processing equipment, the second object being driven by the shuttle, a step of processing at least a first face of a third object and the second face of the second object, during the passage in the first direction of the first face of the third object and second face of the second object facing the processing equipment, the second object and third object being driven by the shuttle, a step of passing the third object in the second direction facing the processing equipment, the third object being driven by the shuttle.

These steps can be repeated several times, to allow the treatment of several faces of several objects. Such a method may exhibit, alone or in combination, the additional characteristics which are described in the present description, in connection with one or other of the embodiments.

BRIEF DESCRIPTION OF THE DRAWINGS

The invention will be better understood on reading the following description of a preferred embodiment, given by way of a simple figurative and non-limiting example, and accompanied by figures including.

DETAILED DESCRIPTION OF THE PREFERRED EMBODIMENTS

Figure 1:
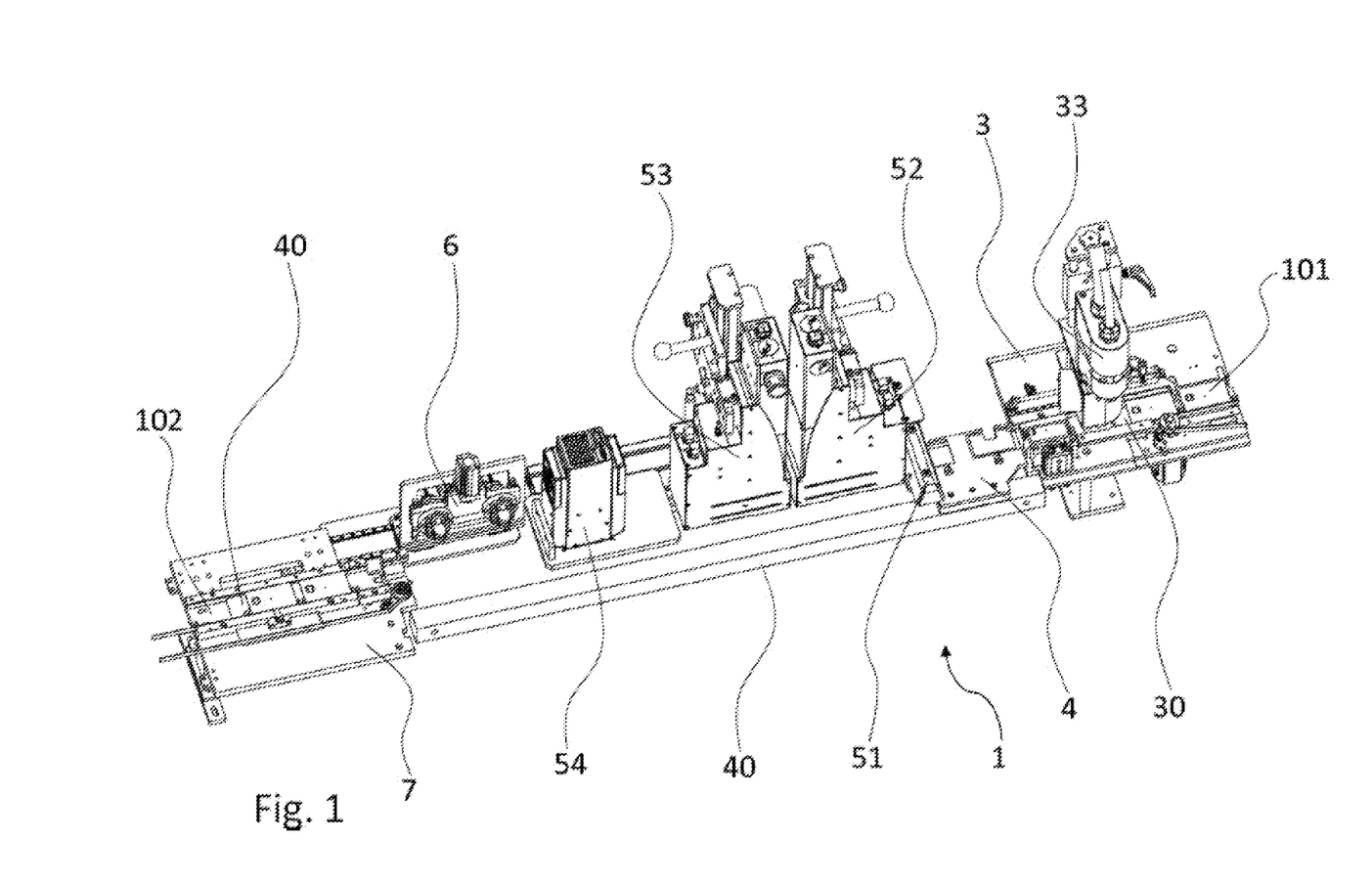
FIG. 1 is a perspective view of a device for processing both faces of cards, according to one embodiment of the invention, in a first position.

FIG. 1 is a perspective view of a device for processing several faces of an object according to one embodiment of the invention, specially adapted for processing the two opposite faces of cards. This device is intended to be integrated into a card personalization chain, which may also include, for example, one or more card programming devices.

In the embodiment represented, this card processing device 1 makes it possible to print both faces of the cards.

The card processing device 1 comprises a plurality of conveyors which make it possible to move a card from an entry position 101 to an exit position 102. Along the path that the cards take in this processing device, the elements closer to the entry position 101 will be considered, in the present description, as "upstream" of the elements closer to the exit position 102. Conversely, the elements closer to the exit position 102 will be considered "downstream" of the elements located closer to the entry position 101.

Figure 2:
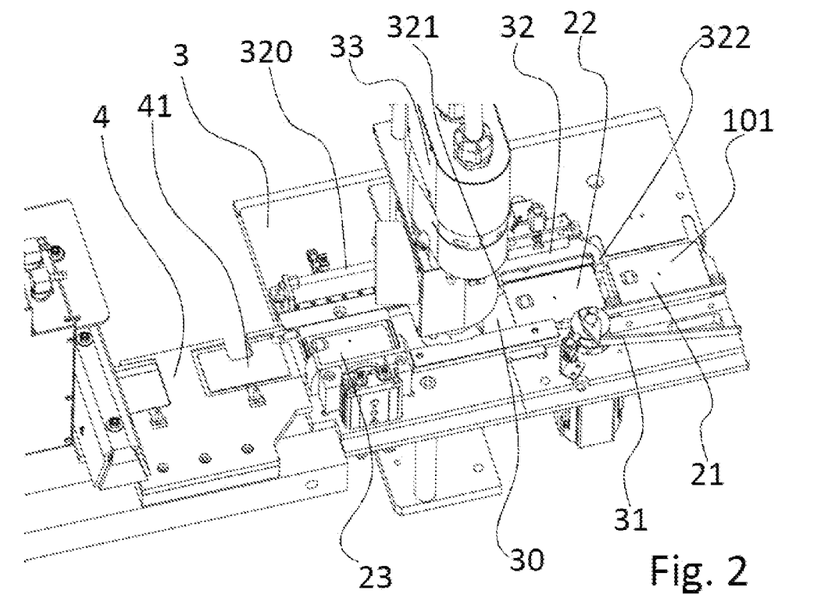
FIG. 2 is a detail view, in perspective, of part of the processing device in FIG. 1, in the first position.
Figure 3:
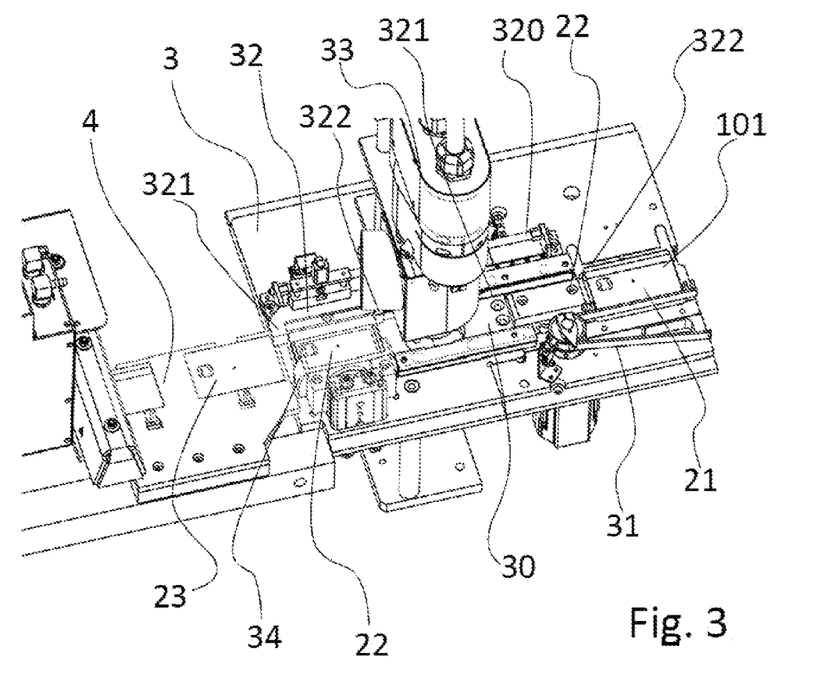
FIG. 3 is a detail view of the part of the processing device shown in FIG. 2, in a second position.

FIGS. 2 and 3 show a detail view of the input tray 3, which constitutes the part of the card processing device 1 on which the input position 101 is located. The cards can move on this input tray 3 following a card path 30, in which they are maintained on a substantially rectilinear trajectory by side edges. The entry position 101 constitutes a position of the card path 30 located at one edge of the tray 3, the rest of the card path 30 being located downstream of this entry position 101. The card path 30 is designed so that the cards move therein in a substantially horizontal position, one of their faces being turned upwards.

In FIG. 2, a card 21 is placed in this entry position 101. It is brought into this position, for example from other processing equipment, by a lug belt 31, the lugs of which push the cards towards the card path 30. From the entry position 101, the lug belt 31 can push the cards further downstream in the card path 30, to the position in which, in FIG. 2, a card 22 is located.

The input tray 3 carries a drive fork 32, which can slide along a rail 320 parallel to the card path 30. It is advantageously driven along this rail, in one direction or the other, by a motor, a jack or any other drive means known to those skilled in the art, which will not be described in more detail. This drive fork 32 is also movable, in a vertical direction, between a high position, in which it can move along the rail 320 without coming into contact with the cards placed in the card path 30, and a low position, in which its fingers 321 and 322 come into contact with the front and rear edges of the cards located in the card path 30.

Thus, in the position shown in FIG. 2, the drive fork 32 is located at the upstream end of the rail 320, which is closest to the entry position 101. This drive fork 32 is in its low position, such that its finger 321 and its finger 322 surround the front and rear edges of the card 22. As long as the drive fork 32 remains in this low position, it can therefore drive the card 22 in translation, by moving along the rail 320.

Thus, FIG. 3 represents the input plate on which the drive fork 32 has moved along the rail 320 as far as its downstream end, by driving the card 22 along the path of card 30.

During this movement, drive fork 32 passes card 22 under card processing equipment which is, in the embodiment, plasma processing equipment 33, which projects a plasma beam onto a face of the card to eliminate surface tension, thereby improving ink adhesion. This plasma processing equipment is able to process the face of each card which is facing upwards, here the first face of the card 22.

At the end of this movement, the card 22 is brought by the drive fork 32 to the position represented by FIG. 3, which constitutes the downstream end of the card path 30 on the input plate 3, opposite entry position 101. In this position, the card 22 is placed in a turning wheel 34 in which a portion of the card path 30 is defined. This turning wheel 34 is able to turn over the card 22, by turning a half-turn around a horizontal axis perpendicular to the direction of the card path.

After this reversal, the card 22 is in the reversed position, while remaining in the card path 30 and held between the fingers 321 and 322 of the drive fork 32. When the turning wheel 34 has thus turned over the card 22, the driving fork 32 can again move downstream, along the rail 320, by driving the turned over card 22, in order to pass this card for a second time under the plasma processing equipment 33. This new passage allows the plasma processing equipment 33 to process the second face of the card 22.

After this second pass of the card under the plasma processing equipment 33, the drive fork 32 brings the card 22 back into the turning wheel 34. The turning wheel 34 can again turn the card 22, so that its first face is again facing upwards.

At this time, drive fork 32 moves to a raised position, in which its fingers 321 and 322 no longer surround the edges of card 22. In this raised position, drive fork 32 moves along rail 320 without driving card 22. It can return to the upstream end of rail 320 to drive a new card, for example card 21 located immediately downstream of card 22. To drive this new card, the drive fork 32 is again moved to its low position, in which the fingers 321 and 322 surround the edges of the card 21.

When the drive fork 32 brings this new card 21 towards the turning wheel 34, its finger 321 pushes out of this turning wheel 34 the card 22 which was placed there previously. The card 22 is thus pushed out of the input tray 3, into a first card slot defined on a carriage 4 which is located, at this moment, next to the input tray 3, in the extension of the card path 30. This movement is identical to that which is represented by FIGS. 2 and 3 for the card 23, which is in the turning wheel 34 in the position represented by FIG. 2, and which is pushed back by the finger 321 towards the first slot 41 in the carriage 4 in the position shown in FIG. 3. The drive fork 32 therefore constitutes a first handling device, capable of placing a card in a first slot in the carriage, or shuttle 4.

Carriage 4, also called shuttle 4, is mounted to slide along a rail 40 extending horizontally, parallel to the direction of card path 30. It is advantageously driven along this rail, in one direction or the other, by a motor, a jack, or any other drive means known to those skilled in the art, which will not be described in more detail. This carriage 4 advantageously has two slots 41 and 42, each intended to receive a card in a horizontal position, one of its faces facing upwards. On this carriage 4, the first slot 41 is located upstream of the second slot 42.

When the drive fork 32 pushes the card 22 out of the tray 3, the carriage 4 is located at the upstream end of the rail 40, so that its first slot 41 is placed in the extension of the card path 30 to receive the card pushed back by the drive fork 32. At this time, the second slot 42 in the carriage 4 is occupied by the card 23, which is placed in this second slot in the upside-down position, its second face facing upwards.

Once the card 22 is in place in the slot 41, the carriage 4 moves along the rail 40 towards the downstream end thereof. During this movement, the slots 42 and 41, and therefore the cards 23 and 22 placed in these slots, pass successively under processing equipment capable of applying a treatment to the faces of the cards 23 and 22 which are facing upwards.

Among these items of processing equipment, one can see in FIG. 1 an ionizer 51 intended to eliminate static electricity on the surface of the cards, a first item of printing equipment 52, a second item of printing equipment 53, and an item of ultraviolet radiation ink drying equipment 54. This equipment makes it possible to apply the desired treatments to the face facing upwards of the cards which are placed in the slots 41 and 42 in the carriage. In this case, in the embodiment shown, they make it possible to print in two colors on the first face of the card 22 and on the second face of the card 23.

The items of printing equipment 52 and 53, which are shown schematically in FIG. 1, constitute the main items of processing equipment of the processing equipment 1. This equipment is advantageously ink jet equipment known per se to a person skilled in the art, which projects ink onto the face facing upwards of the cards circulating under the printing equipment. Such printing equipment may be monochrome or polychrome. In the case represented, the items of printing equipment 52 and 53 are monochrome, each in a different color, and are placed successively to print in two colors on the face of the cards which is turned upwards. This printing equipment is preferably of the type making it possible to deliver drops of ink on demand. Such equipment is usually designated as "drop on demand" or by the acronym "DOD".

It should be noted that, in other embodiments of the invention, it is possible to implement, in the processing device 1, other processing equipment. It is possible, for example, for the processing equipment to be equipment for laser engraving, label deposition on one face of the card, or varnishing of one face of the card.

Advantageously, this processing equipment is capable of carrying out the processing continuously, that is to say that they can carry out their processing on one face of a card circulating at a constant speed, without there being any need to stop or slow down the carriage circulating the cards to perform the processing.

Figure 4:
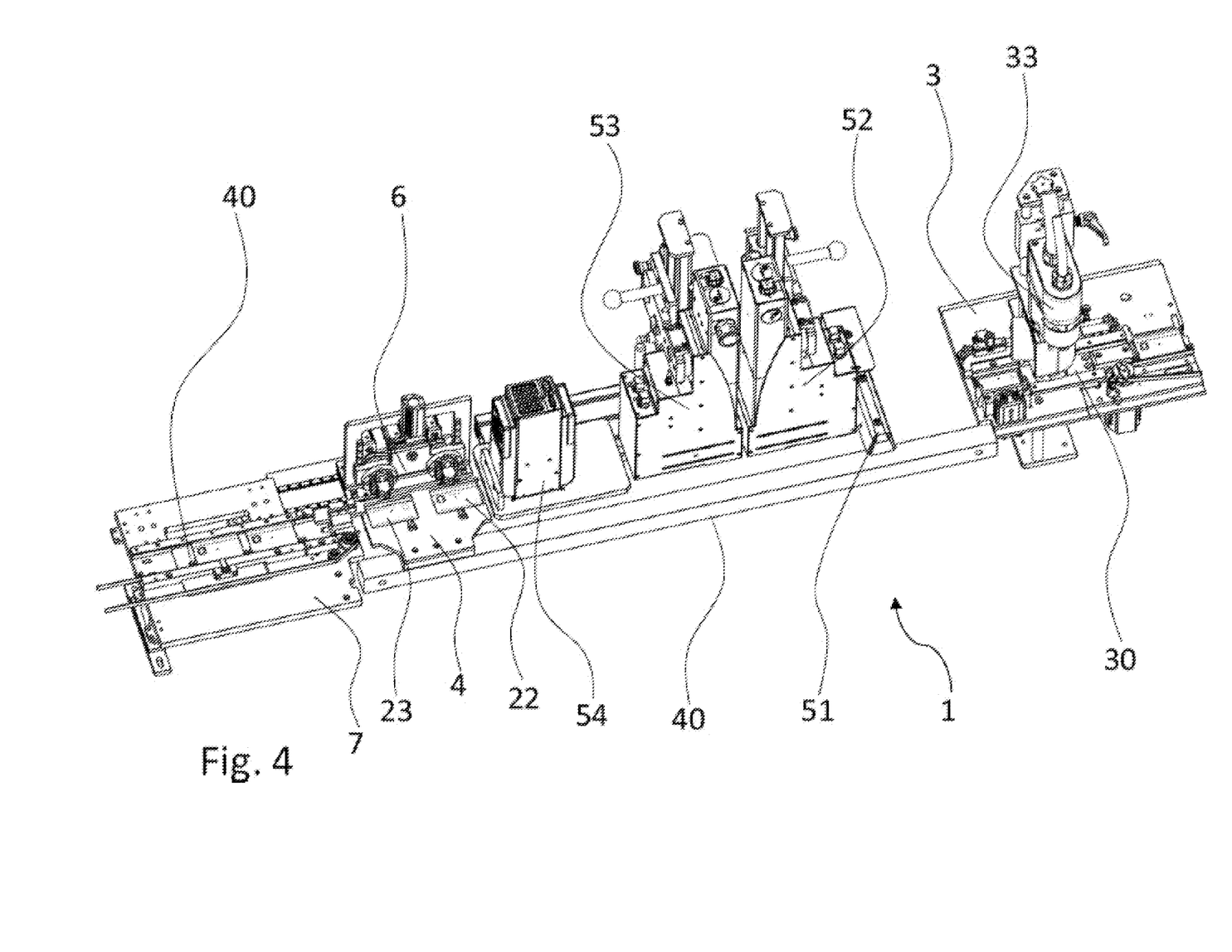
FIG. 4 is a perspective view of the processing device in FIG. 1, in a third position.

FIG. 4 represents the processing equipment 1 in which the carriage 4 is in its downstream position, after having traversed the rail 40 as far as its downstream end, by causing the cards 23 and 22 to pass under the items of processing and printing equipment 51 to 54. The card 22 which is in the first slot 41 then has its first face, facing upwards and visible in the figure, printed by the printing equipment. The card 23 which is in the second slot has its second face, facing upwards and visible in the figure, printed by the printing equipment.

Figure 5:
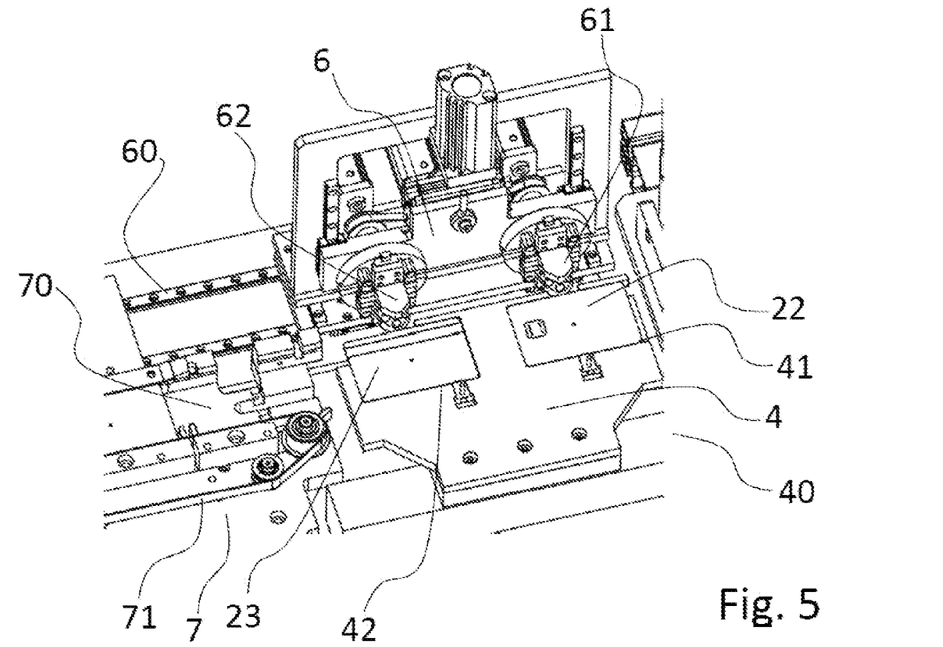
FIG. 5 is a detail view of part of the processing device in the third position.
Figure 6:
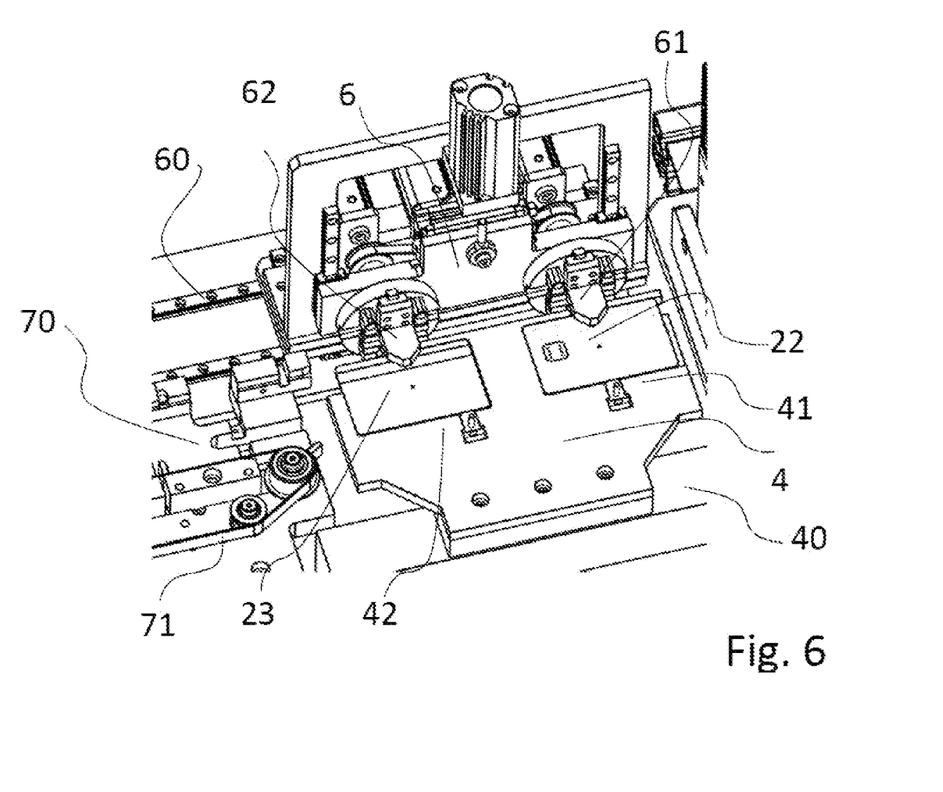
FIG. 6 is a detail view of the part of the processing device represented by FIG. 5, in a fourth position.

When the carriage 4 is in this downstream position, as shown in FIGS. 5 to 10, it is located opposite a handler 6. This handler 6 has two clamps 61 and 62 each constituting an item of handling equipment, and which, in the position of the handler 6 represented by FIG. 5, are respectively opposite the slots 41 and 42 in the carriage 4. The clamps 61 and 62 are movable, together, in translation, in a direction perpendicular to the direction of the rail 40, between the position shown in FIG. 5 in which the clamps 61 and 62 are opposite the slots 41 and 42, and the position represented by FIG. 6, in which the clamps 61 and 62 are advanced towards the carriage 4 and respectively grasp the cards 22 and 23 placed in the slots 41 and 42.

It should be noted that the carriage 4 has notches specially intended to allow this advance of the clamps 61 and 62. In the situation represented by FIG. 6, the clamp 61 grabs the card 22 placed in the slot 41, and the clamp 62 grabs the card 23 placed in the slot 42.

Figure 7:
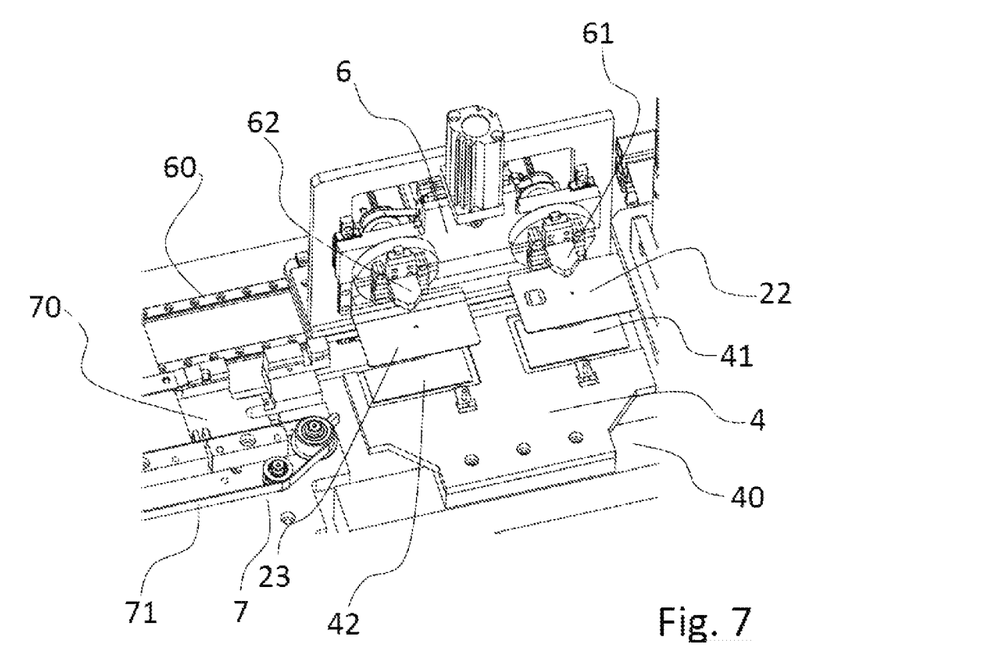
FIG. 7 is a detail view of the part of the processing device represented by FIG. 5, in a fifth position.

After having seized the cards present in slots 41 and 42, the clamps 61 and 62 move upwards, in order to remove the cards from slots 41 and 42, as shown in FIG. 7. Each of these clamps 61 and 62 then pivots on itself by half a turn, around a horizontal axis orthogonal to the direction of the rail 40. This pivoting has the effect of turning over the cards held by the clamps 61 and 62.

Figure 8:
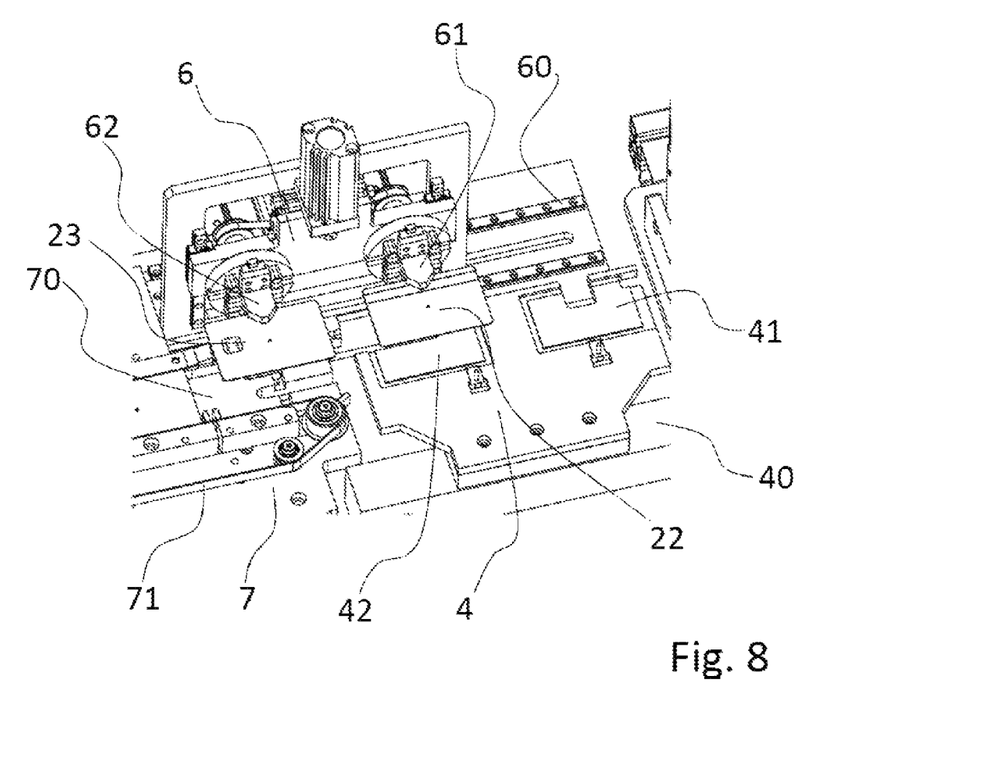
FIG. 8 is a detail view of the part of the processing device represented by FIG. 5, in a sixth position.
Figure 9:
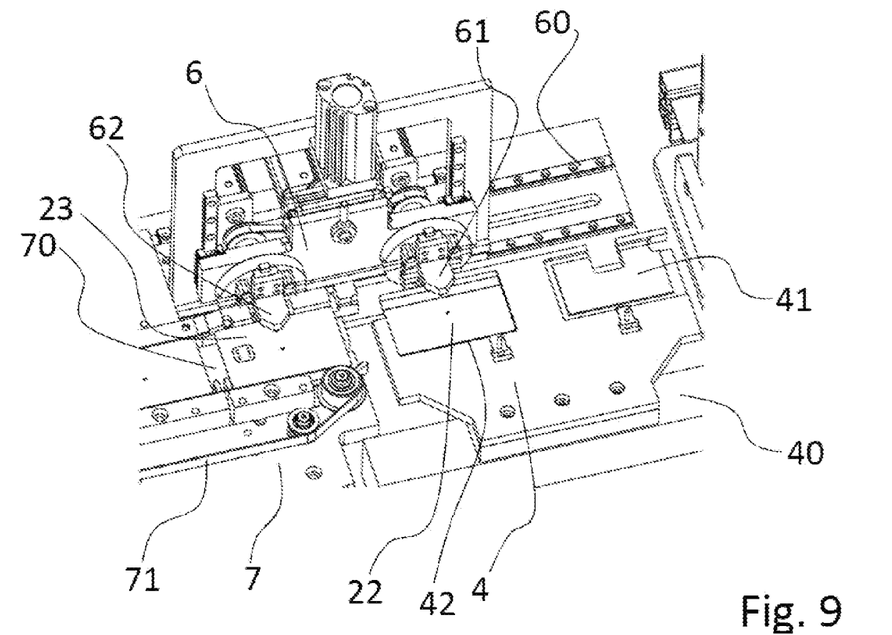
FIG. 9 is a detail view of the part of the processing device represented by FIG. 5, in a seventh position.

During this pivoting, the whole of the handler 6 moves, along a rail 60 parallel to the rail 40, until the clamp 61 is located above the slot 42, as shown in FIG. 8. Clamps 61 and 62 are then moved down to the position shown in FIG. 9, which has the effect of placing card 22, held by clamp 61, in slot 42. This movement also allows the clamp 62 to deposit the card 23 on a card path 70 of an output tray 7, which is close to the carriage 4 when the carriage is in its downstream position.

Figure 10:
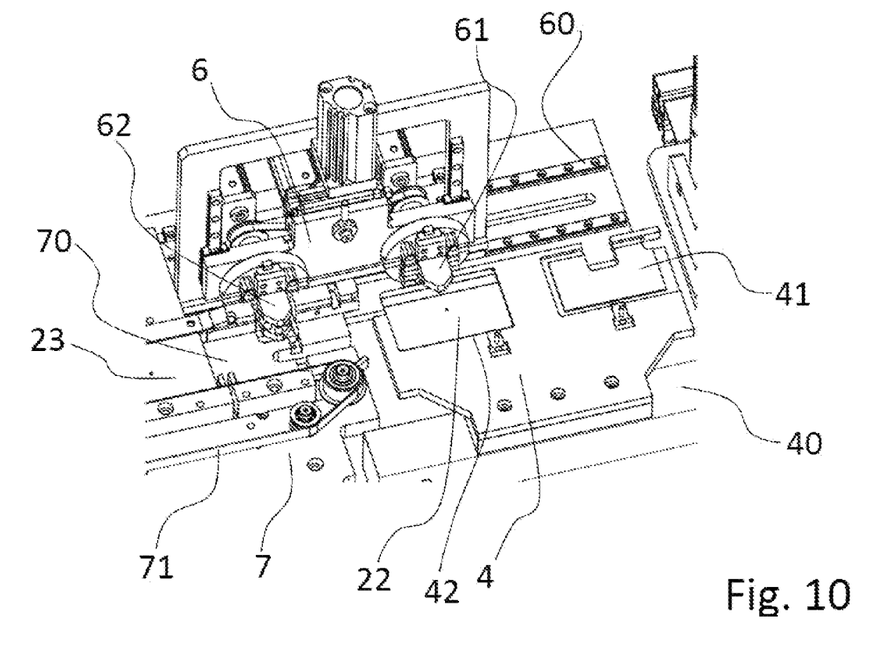
FIG. 10 is a detail view of the part of the processing device represented by FIG. 5, in an eighth position.

On the tray 7, a lug belt 71 allows the card 23 to be driven in the card path 70 towards the exit position 102, at the downstream end of the tray 7, as shown in FIG. 10. From this exit position 102, the cards can be driven to undergo further processing, to be stored or to be sent.

Clamps 61 and 62 then perform a horizontal translation movement moving them away from carriage 4 and card path 70. Clamps 61 and 62 then release the cards they were carrying, which are respectively held by the edges of slot 42 and the edges of card path 70. At the end of the operation carried out by the handler 6, the card 22 which was in the first slot 41 in the carriage 4 is placed, in the upturned position, in the second slot 42 in this carriage, and the card 23 which was in the second slot 42 in the carriage 4 is placed, in the upturned position, in the card path 70 of the output tray 7.

Thus, the clamp 61 constitutes a handling device capable of removing the card placed in the second slot 42, and the clamp 62 constitutes a handling device capable of removing the card placed in the first slot 41 and of turning it before placing it in the second slot 42.

The carriage 4, whose first slot 41 is now empty, moves again to its upstream position. During this movement, it passes under the equipment 54 to 51, but this equipment preferably does not perform any processing.

When the carriage 4 is again in its upstream position, at the upstream end of the rail 40, it is close to the input tray 2, and can receive in its slot 41 a new card 21, pushed by the drive fork 32 out of input tray 3.

The carriage 4, then containing the card 22 in the second slot 42 and the card 21 in the first slot 41, can again move along its rail 40 towards its downstream position, passing under the processing equipment 51 to 54. This processing equipment then carries out its processing, in this case printing, on the faces facing upwards of the cards 21 and 22 contained in the slots 41 and 42. For card 22, this printed face is the second face, opposite the first face which was printed previously.

During this new passage of the carriage 4, the processing equipment therefore successively prints on the second face of the card 22, including the first face which was printed previously, then on a first face of the new card 21.

At the end of this new passage, when the carriage 4 reaches its downstream position, the handler 6 seizes the card 21 placed in the first slot 41 to place it, in the upturned position, in the second slot 42, and simultaneously seizes the card 22, both faces of which have been printed, to place it on the card path 70 of the output tray 7.

The carriage 4, which comprises two slots each able to contain a card, thus makes it possible to carry out the processing of the two faces of the same card with the same printing equipment. By passing the two cards very close to each other under the processing equipment, it makes it possible to obtain a good processing rate. It should also be noted that the processing of the second face of each card is carried out by the processing equipment immediately after the processing of its first face, before the processing of one face of another card.

If the embodiment described above represents a device specially adapted to the treatment of the two faces of a card, it is possible to implement the invention for the treatment of any type of object, having at least two faces, opposite or not opposite.

FIGS. 11 to 15 thus schematically represent a processing device 8 according to another embodiment, capable of processing several faces of a parallelepiped-shaped object.

This device comprises input equipment 81 and output equipment 82. A carriage 83, or shuttle 83, can move along a rail 84 between an upstream position represented by FIGS. 11 and 12 and a downstream position represented by FIGS. 14 and 15.

Figure 11:
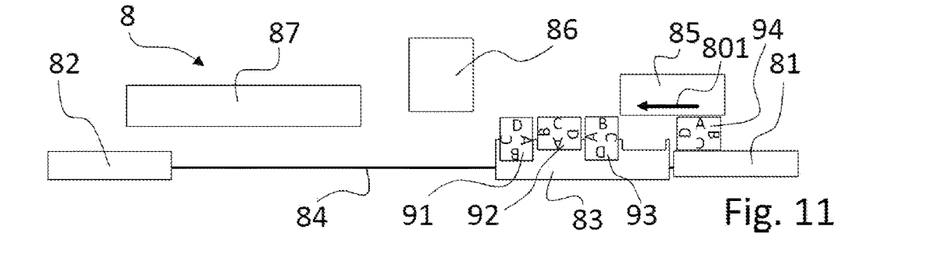
FIG. 11 is a schematic view showing a device for processing four faces of a parallelepipedic object, according to another possible embodiment of the invention, in a first position.

The carriage 83 has four slots intended to receive identical objects, 91 to 94, in different positions.

Figure 12:
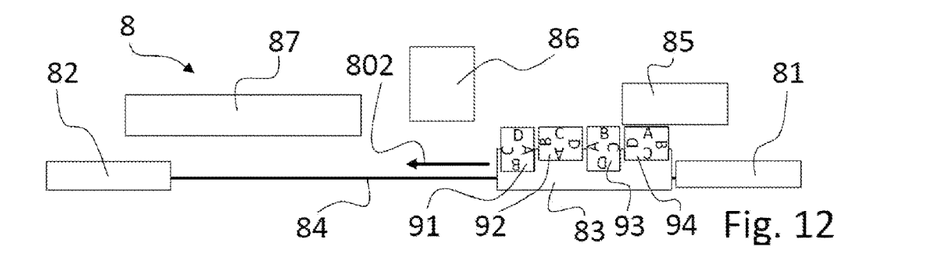
FIG. 12 is a schematic view of the processing device in FIG. 11 in a second position.
Figure 13:
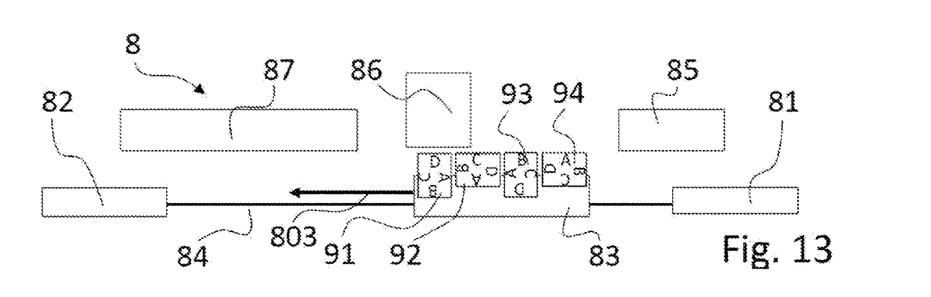
FIG. 13 is a schematic view of the processing device in FIG. 11 in a third position.
Figure 14:
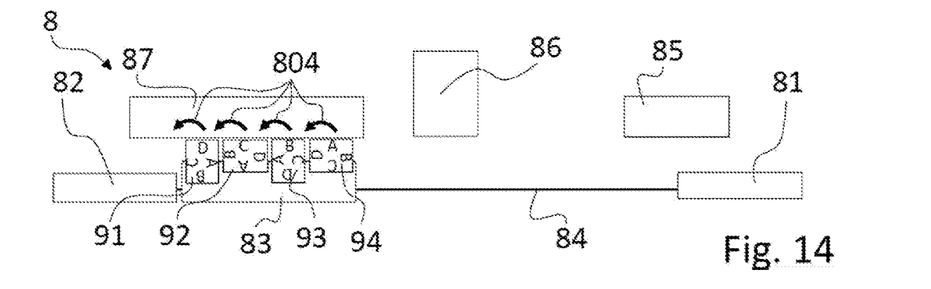
FIG. 14 is a schematic view of the processing device in FIG. 11 in a fourth position.

Thus, in the configuration shown by FIGS. 12 to 14, an object 94 is placed in a first slot in a position such that its face marked "A" is facing upwards and, in the configuration shown by FIGS. 11 to 14, an object 93 is placed in a second slot in a position such that its face marked "B" is facing upwards, an object 92 is placed in a third slot in a position such that its face marked "C" is facing upwards, an object 91 is placed in a fourth slot in a position such that its face marked "D" is facing upwards.

In the configuration represented by FIG. 11, the object 94 is placed on input equipment 81, and carriage 83 is in its upstream position, close to input equipment 81. A first handling device 85, the operation of which is not explained in detail, makes it possible to move the object 94, as shown schematically by the arrow 801, to the first slot in the carriage 83, which was previously empty.

In this configuration represented by FIG. 12, each of the four slots in the carriage 83 contains an object. The carriage 83 can then move towards its downstream position as shown schematically by the arrow 802. During its movement, as shown in FIG. 13, it successively passes each of the objects carried in its slots under processing equipment 86, capable of applying a treatment to the face of the objects 91 to 94 which is turned upwards.

The carriage then continues its movement, as shown schematically by the arrow 803, to its downstream position shown in FIG. 14. In this position, objects 91 to 94 are located under handling equipment 87. This handling equipment 87, the operation of which is not explained in detail, is designed to simultaneously handle the objects 91 to 94 placed in the slots in the carriage 83, and move them downstream to the slot which is adjacent to them, while turning them a quarter turn, as shown schematically by the arrows 804.

Figure 15:
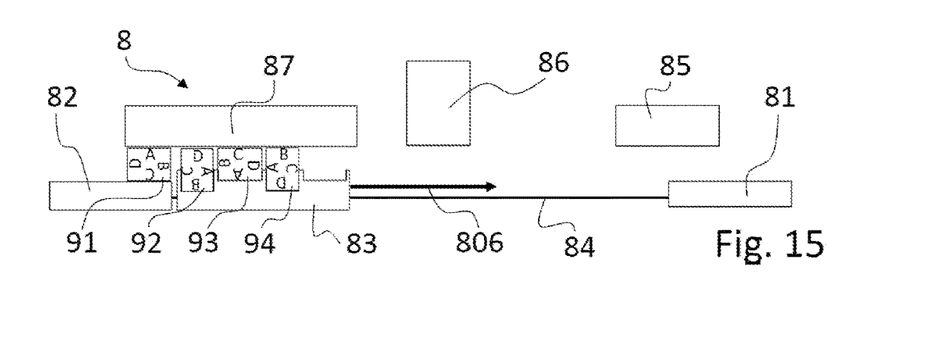
FIG. 15 is a schematic view of the processing device in FIG. 11 in a fifth position.

At the end of this operation, as shown in FIG. 15, the object 91 is placed on the output equipment 82, the objects 92 to 94 respectively occupy the fourth, the third and the second slots in the carriage 83, and the first slot in the carriage 83 is free. This carriage 83 can then move again towards its upstream position, as shown by the arrow 806, to receive a new object in its first slot and repeat the steps previously described.

An object traversing this processing device 8, from the input equipment 81 to the output equipment 82, will therefore perform four successive movements, in the carriage 83, from the upstream position to the downstream position of this carriage. During each of these movements, this object passes under the processing equipment 86, presenting one of its different faces upwards. The device therefore allows the successive processing, by the processing equipment 86, of the four faces of the object.

It is also possible, in yet another embodiment, for a carriage to comprise several slots constituting first slots, each intended to receive an object coming from input equipment, upstream of the processing carriage, and several slots constituting second slots, each intended to receive an object coming from a first slot, after it has been returned, for example downstream of the processing equipment.

Figure 16:
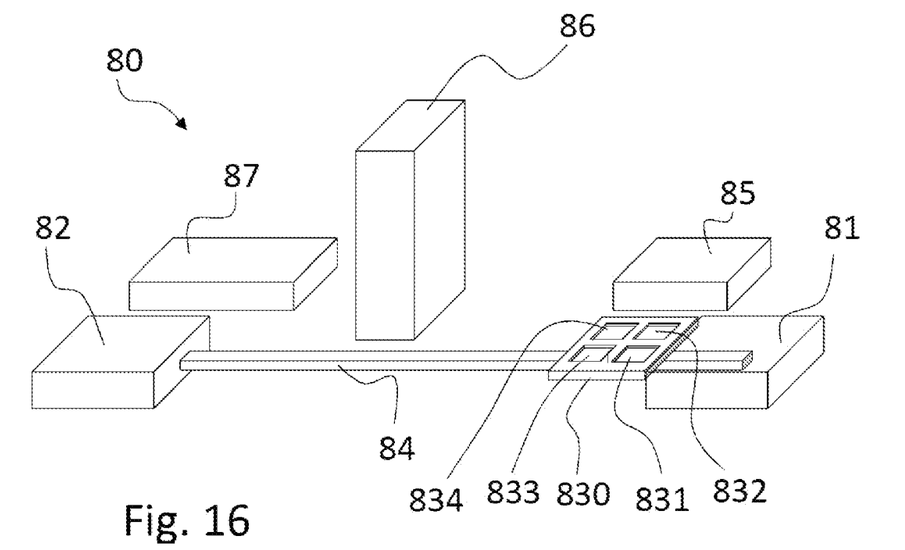
FIG. 16 is a schematic view, in perspective, showing a processing device according to another possible embodiment of the invention.

Thus, FIG. 16 shows a processing device 80 according to another embodiment, capable of processing two faces of objects. This device comprises input equipment 81 and output equipment 82. A carriage 830, or shuttle 830, can move along a rail 84, between an upstream position and a downstream position, passing under processing equipment 86.

In this embodiment, a first handling device 85 makes it possible to simultaneously place on the carriage 830 two objects coming from the input device 81, one in the slot 831 and the other in the slot 832, when this carriage 830 is in its upstream position. Slots 831 and 832 are then both first slots.

When the carriage 830 is in the downstream position, the second item of handling equipment 87 makes it possible to place, in the inverted position, in the slot 833 the object which was in the slot 831 and in the slot 834 the object which was in slot 832. Slots 833 and 834 are then both second slots.

In this embodiment, the processing equipment 86 is provided to be able to process the faces of all the objects placed in the slots in the carriage 830, therefore several objects circulating abreast.

In the embodiments represented above, the shuttle comprising several slots is a carriage which carries the objects which it moves opposite an item of processing equipment. It is also possible, in other embodiments, for a shuttle to drive several objects to several slots, without carrying them.

Figure 17:
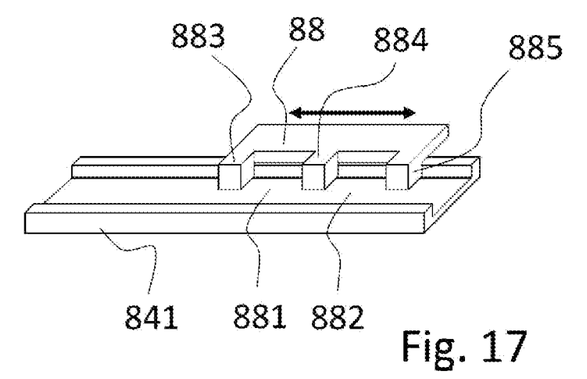
FIG. 17 is a schematic view, in perspective, showing part of a processing device according to another possible embodiment of the invention.

Thus, FIG. 17 shows a segment of a path 841 that can be used to move objects past processing equipment. A fork 88 can move along this path 841. It has three fingers 883, 884 and 885, which can drive in the path 841 the objects they surround. The fork 88 therefore constitutes a shuttle capable of simultaneously moving two objects, a first object in a first slot 882, between the finger 884 and the finger 885, and a second object in a second slot 881, between the finger 883 and the finger 884.

Those skilled in the art can of course imagine other types of shuttles, to implement the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for processing several faces of objects, comprising at least one item of processing equipment capable of carrying out a treatment on one face of an object presented facing said processing equipment;
 a shuttle having at least two slots suitable for receiving objects, said shuttle being mounted to move between a first position and a second position, via intermediate positions in which the shuttle presents a face of the objects placed in said slots opposite said processing equipment;
 a first handling device, configured to place an object in a first of said slots, when said shuttle is in said first position;
 a second handling device configured to remove an object placed in a second of said slots; and
 a third handling device configured to remove the object placed in said first slot and to turn the object before placing the object in said second slot.

2. The device for processing several faces of objects according to claim 1, wherein said third handling device is placed so as to handle the objects carried by said shuttle when said shuttle is in said second position.

3. The device for treating several faces of objects according to claim 1, wherein said second handling device is placed so as to manipulate the objects carried by said shuttle when said shuttle is in said second position.

4. The device for processing several faces of objects according to claim 1, wherein said at least one item of processing equipment comprise at least one printer configured to print on one face of an object.

5. The device for processing several faces of objects according to claim 4, wherein said printer is of a "drop on demand" type.

6. The device for processing several faces of objects according to claim 1, wherein said at least two slots are arranged, with respect to said shuttle, so as to pass successively opposite said item of processing equipment, when moving said shuttle between said first position and said second position.

7. The device for processing several faces of objects according to claim 6, wherein said slots are arranged, with respect to said shuttle, so that said second slot passes opposite said item of processing equipment before said first slot when moving said shuttle from said first position to said second position.

8. The device for processing several faces of objects according to claim 1, wherein said first and second slots are each configured to receive a flat object placed in a substantially horizontal position, leaving an upper face of said object visible.

9. The device for processing several faces of objects according to claim 1, wherein said shuttle is movable in translation, between said first position and said second position, along at least one guide rail.

10. The device for processing several faces of objects according to claim 1, further comprising a handler comprising a clamp constituting said second handling device and a clamp constituting said third handling device.

11. The device for processing several faces of objects according to claim 1, wherein said shuttle is a carriage in which said slots are defined, said carriage being able to carry the objects placed in said slots.

12. A method of treating multiple object faces, comprising:

placing a first object in a first slot provided in a shuttle, the shuttle having a second slot comprising a second object;

moving said shuttle along a trajectory during which one face of each of said first and second objects passes opposite processing equipment configured to carry out a treatment on said face;

unloading said second object from said second slot, unloading said first object from said first slot, turning over said first object, and placing said first object, in an inverted position, in said second slot.

\* \* \* \* \*